Patented Feb. 10, 1948

2,435,619

UNITED STATES PATENT OFFICE 2,435,619

LUBRICANT COMPOSITIONS

David W. Young, Roselle, and William J. Sparks, Cranford, N. J., assignors to Standard Oil Development Company, a corporation of Delaware No Drawing. Application January 15, 1944, Serial No. 518,393

9 Claims. (Cl. 252—56)

This invention relates to the solvent separation of high molecular weight organic compounds containing carbon and hydrogen and some inorganic element such as oxygen or nitrogen, and having molecular weight above 2,000, and to the use of the resulting separated product for various purposes. More particularly the invention relates to the solvent precipitation of high molecular weight polyesters of a dibasic acid and a glycol, in order to recover therefrom a product substantially completely soluble in highly paraffinic oils, especially of the lubricating oil boiling range, even at low temperature, in other words, a polymer that does not settle out of solution at low temperatures or high temperatures in a high viscosity index mineral oil.

The original application Serial No. 504,754, filed October 2, 1943, of which the present application is a continuation-in-part, discloses the preparation of certain types of polyesters, such as made by condensing dilinoleic acid with ethylene glycol or decamethylene glycol, and the use of the resulting products in hydrocarbon compositions such as lubricating oils, gas oils, paraffin wax, asphalt, etc.

The polyesters chiefly described in that application, and preferred for use in the present invention, are those made from dimeric fatty acids or esters thereof, such as made by Bradley & Johnson (Ind. Eng. Chem. 33, 86, (1941)) for the preparation of methyl dilinoleate from dehydrated castor oil. Soy bean oil is also satisfactory, and is even preferred.

The following is given as a specific example of the preparation of a suitable dimer acid and subsequent condensation with a glycol to produce the preferred type of polyester. Soy bean oil is converted by methanolysis to methyl esters, as by heating to 70° C. with a liberal excess of methanol in the presence of a substantial portion of sodium methalate for several hours, and then the distilled methyl esters are polymerized by heating to 300° C. with a suitable catalyst such as 0.3% of anthraquinone, for a suitable period such as about 10-30 hours. Unpolymerized esters are then removed by distillation under reduced pressure of 1-5 mm. and the residual methyl dilinoleate is carefully fractionated in a short path pot still (a modified alembic flask) at 2 to 50 microns, or in a cyclic molecular still at 2 to 5 microns. The several distilled dimer methyl esters of soy bean oil, i. e., methyl dilinoleate, had an index of refraction of N 30/D 1.4766. This dimer acid ester is then used as raw material in the following experimental work.

EXAMPLE 1

A mixture of 37 grams of the methyl dilinoleate described above and 11.2 grams of decamethylene glycol was heated with about 0.25 gram of paratoluene sulfonic acid as catalyst, under nitrogen, for about 98 hours. A gentle stream of nitrogen through the reaction mass served to stir the mixture and to facilitate removal of alcohol formed in the reaction. No air or oxygen was present in the reaction at any time. The resulting polyester had a molecular weight of about 22,500 by viscosity test; it was soluble in chloroform at room temperature and insoluble in Barosa 43 mineral oil (a highly paraffinic lubricating oil having a viscosity of 43 seconds Saybolt at 210° F. and a viscosity index of about 110 or 112). However, a 6% solution of such polyester in such paraffinic oil, which gradually cooled, showed a cloud point of 15° C.

The primary object of the present invention is to subject such a polyester to solvent separation in order to obtain therefrom a fraction completely soluble in highly paraffinic oil even at extremely low temperatures.

Thirty grams of the polyester thus obtained was dissolved in 200 grams of Barosa 43 mineral oil at 140° C. The mineral oil had been saturated with nitrogen at room temperature, and nitrogen was added to the oil solution as the temperature was increased to 140° C. This was for the purpose of avoiding any possibility of oxidation of the polyesters during the solvent separation. The polymer-oil mixture was then placed in a 1-liter flask under an atmosphere of nitrogen and then placed in an ice-box at about 15-20° F. for 17 hours, during which time some of the polyesters separated out of solution and settled to the bottom of the flask while other particles of precipitated polyesters remained suspended in the oil. The cold mixture was filtered through paper and a layer about 10 mm. thick of Hy-Flow, which is a calcined diatomaceous earth, at about 15-20° C., using vacuum to assist in the filtration. The filtrate which was then only slightly turbid was treated with about 15% by volume of dibutoxy ethyl phthalate and about 50% by volume of 99% isopropyl alcohol, in order to precipitate the rest of the polyester which was substantially completely dissolved in the Barosa mineral oil. The dibutoxy ethyl phthalate was merely used to solubilize the alcohol into the polymer-oil blend. The amount of soluble polyester thus recovered was about 17 grams and it had an average molecular weight of about 9,000.

EXAMPLE 2

The solvent-precipitated soluble polyester made as described above in Example 1 was tested in solution in various types of mineral oil. When dissolved in various concentrations ranging from 1 to 5% in a paraffinic lubricating oil base stock consisting of 90% of a Pennsylvania neutral oil having a viscosity of about 141 seconds at 100° F., a viscosity index of 102, a pour point of +30° F. and a cloud point of +32° F., and 10% of a bright stock, the following pour, cloud and viscosity data were obtained.

TABLE I

*Solutions of soluble polyester in lubricating oil*

|  | A. S. T. M. | | Saybolt Viscosity,[1] Sec., at— | | V. I. |
|---|---|---|---|---|---|
|  | Pour, °F. | Cloud, °F. | 100° F. | 210° F. |  |
| Test Oil | +30 | +34 | 185.2 | 45.82 | 103 |
| Test Oil+1% Polyester | −20 | +32 | 216.7 | 50.17 | 126.5 |
| Test Oil+2.5% Polyester | −15 | +32 | 280.6 | 58.84 | 138 |
| Test Oil+5.0% Polyester | 0 | +32 | 408.9 | 78.92 | 145 |

[1] Converted from kinematic.

The above table shows that this soluble polyester is a potent V. I. improver since it increased the viscosity index from 103 up to 145 in 5% concentration, and also has very substantial pour-depressing properties, obtaining the lowest pour point in a concentration of about 1% (having reduced the pour point from +30° F. to −20° F.), and even has a slight effect in lowering the cloud point of the oil from +34 to +32. This slight lowering of the cloud point is not of very substantial magnitude, but is significant because very many lubricating oil additives have quite a reverse effect, namely of increasing the cloud point if they have any effect at all thereon.

EXAMPLE 3

In order to study further the cloud depressing effect, the soluble polyester was dissolved at various concentrations ranging from 0.5% to 6.3%, in a high cetane number Diesel fuel base stock (having a cetane number of 59.7), which is a highly paraffinic oil. The cloud point data obtained were as follows:

TABLE II

| | Cloud point, °C. |
|---|---|
| Diesel fuel | −4.2 |
| Diesel fuel+0.5% soluble polyester | −7.3 |
| Diesel fuel+1.4% soluble polyester | −5.8 |
| Diesel fuel+3.0% soluble polyester | −5.0 |
| Diesel fuel+6.3% soluble polyester | −4.2 |

These data indicate that the soluble polyester has a very pronounced and highly unexpected effect in lowering the cloud point of the paraffinic Diesel fuel base stock, especially in low concentration up to about 0.5% which lowered the cloud point from −4.2° C. to −7.3° C. Although data on lower concentrations is not available at present, it is believed that even lower cloud points are obtainable with concentrations of soluble polyesters ranging from about 0.2 to 0.4%. These polyesters also raise the cetane number of gas oils used as Diesel fuel base stocks.

The Diesel fuel base stock used in the above test is known as CFR (cooperative fuel research) fuel #3.

The soluble polyester of this invention has a number of other valuable properties, such as good compatibility with other additives in lubricating oil solutions, such as dyes, and polymerized silicones

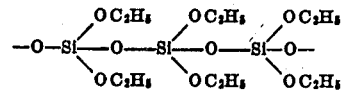

etc., and resistance to mechanical breakdown of molecular weight by shearing. It also has some value as a detergent in lubricating oil compositions subjected to unusually severe operating conditions such as high temperature, as in the case of Diesel engine lubricants; it is also useful as a tackiness additive in lubricating greases, cylinder lubricants, wax compositions, asphaltic compositions, etc. It may be used to good advantage as a rubber compounding agent, and it may also be used for various other purposes for which the original mixed polyester was described as useful in the original application 504,754. It is also useful in solution in refined kerosene or gas oil base stocks as a gun recoil oil.

In carrying out the solvent precipitation of this invention as described above, it is possible to vary the process by using other solvents than the Barosa 43 paraffinic lubricating oil. For instance, other paraffinic lubricating oils having a V. I. of about 100 may be used or lighter paraffinic mineral oil fractions may be used, such as a paraffinic gas oil or a petroleum ether or other types of paraffinic naphtha, or even liquefied gaseous hydrocarbons such as propane, butane, etc., may be used, in which latter case the technique used may be similar to that used in the propane precipitation of asphalt from lubricating oil stocks, namely by heating the mixture to effect complete solution, and then cooling and/or reducing the pressure to precipitate out the least soluble polyester fractions which normally tend to precipitate out of the paraffinic lubricating oil solution at low temperature. If desired, even naphthenic or aromatic oils or halogenated hydrocarbons such as chloroform and the like may be used, or mixtures of various hydrocarbon oils or other solvents may be used. In case a material is used as solvent which completely dissolves the mixed polyesters even at low temperature, then a small amount of non-solvent or anti-solvent is added to the solution in order to cause precipitation of the least soluble polyester fraction. Suitable non-solvents include the lower alcohols, such as methanol, ethanol, isopropyl alcohol, etc., or lower ketones such as acetone and the like, or ordinary water, or mixtures.

If desired, the precipitated insoluble polyester fraction may be separated from the residual solution by settling and decanting, followed, if desired, by washing with a highly paraffinic oil, e. g., naphtha, petroleum ether, or a lube oil fraction.

Although separation of the polyesters by solvent precipitation as above described is preferred, solvent extractions may also be used under some circumstances, such as by contacting the polyester with a highly paraffinic oil at low temperature, such as 0–15° F. in order to extract the fractions of polyester which are soluble in the paraffinic oil and to leave undissolved the fractions which are insoluble in such an oil. Solvent extraction may also be carried out at elevated temperatures such as 85 to 125° F. at which the polyester is liquid, using as solvent a material such as phenol, nitrobenzene, liquid $SO_2$, chloroform, chlorobenzene, alcohol mixtures, etc.

In preparing the crude or mixed polyester, various alternative raw materials may be used, such as are more fully described in original application 504,754, now Patent No. 2,424,588, patented July 29, 1947 which lists a number of glycols or dihydroxy organic compounds which may be used ranging from ethylene glycol to higher aliphatic glycols such as 12-hydroxy stearol or higher, as well as other compounds containing aromatic or mixed aromatic aliphatic organic groups between the two hydroxyl groups. Various saturated as well as unsaturated fatty acids may be used in preparing the dimeric fatty compounds having an organic, preferably aliphatic or mixed aliphatic aromatic hydrocarbon, group between two COO groups representing either carboxyl group or lower aliphatic, e. g., methyl, ester group.

Although it is not intended that the invention be unnecessarily limited by any theories as to the operation of the invention, it is believed that the highly unexpected advantages of the invention are partly due to the removal by solvent precipitation of polyesters containing cross-linkages which tend to cause gel formation or insolubility, and partly due to the removal of polyesters (when formulated from the dimer acid and glycol) containing terminal groups which tend to promote insolubility, such as carboxyl group, because the insoluble polyester thrown down by solvent precipitation gave an acid titration whereas the soluble polyester gave a neutral titration. In the experimental work the low temperature Barosa 43 mineral oil soluble polymers were removed from the oil by the dibutoxy ethyl phthalate-alcohol non-solvent procedure and then titrated at 25° C. with 0.1 N alcoholic potassium hydroxide using phenolphthalein as indicator. The solvent for the reaction was dry chloroform. This procedure has been used by Paul J. Flory (see Journal of the American Chemical Society, vol. 62, page 1059, May 1940) to determine the end group present in other polyesters. Results show that 5 grams of the soluble polymer gave 0.0 ml. titration to end point with 0.1 N alcoholic potassium hydroxide, while 5 grams of the oil-insoluble polymer gave a titration of 1.4 ml. of 0.1 N KOH.

Although the invention is believed particularly applicable to the solvent separation of polyesters made by the condensation of a glycol with a dimeric fatty acid or ester, especially one having more than 10 carbon atoms between the two COO groups, the invention is considered broadly applicable to the solvent separation of other types of polyesters having a molecular weight above 2,000, preferably between 6,000 and 30,000, such as polyesters made by the polymerization of fatty oils. In an even broader sense it may be applied to all types of high molecular weight organic compounds of carbon and hydrogen which also contain oxygen and/or nitrogen, including synthetic polymeric compounds such as polyacrylic esters, e. g., polylauryl alpha-methacrylate, polyvinyl esters, etc.

It is not intended that the invention be limited to the specific examples which have been given merely for the sake of illustration, but only by the appended claims in which it is intended to claim all novelty inherent in the invention and all modifications coming within the scope and spirit of the invention.

We claim:

1. A composition comprising a major proportion of mineral lubricating oil and about 0.1 to 10% of a polyester condensation product selected from the group which consists of a dicarboxylic acid and lower aliphatic ester thereof and a glycol, at least one of said monomeric substances having at least 10 carbon atoms per molecule, the said polyester being completely soluble in paraffinic oil having a viscosity index of at least 100, at temperatures as low as 30° F., and being substantially free from polyester fractions less soluble in such paraffinic oil.

2. A composition comprising a major proportion of an aliphatic hydrocarbon material and about 0.1 to 10% of a polyester condensation product of methyl dilinoleate and decamethylene glycol, said polyester having an average molecular weight of about 9,000 and being completely soluble in paraffinic oil having a viscosity index of at least 100, at temperatures as low as 15° F., and being substantially free from three dimensional polyester compounds containing cross-linkages and also free from compounds having carboxyl terminal groups, said polyester also having viscosity improving pour depressing and cloud depressing properties, and being substantially free from polyester fractions less soluble in such paraffinic oil.

3. A composition comprising a major proportion of mineral lubricating oil and a V. I. improving amount of a polyester condensation product of the reaction of a compound selected from the class consisting of dicarboxylic acids and lower aliphatic esters of dicarboxylic acids with a glycol, at least one of said monomeric substances having at least 10 carbon atoms per molecule, the said polyester being completely soluble in paraffinic oil having a viscosity index of at least 100, at temperatures as low as 30° F., and being substantially free from polyester fractions less soluble in such paraffinic oil.

4. The composition comprising a major proportion of an aliphatic hydrocarbon material and dissolved therein a minor but improving amount of a solvent-separated polyester fraction having an average molecular weight of at least 2,000, being completely soluble in paraffinic oil at temperatures as low as 15° F. and being substantially free from three-dimensional polyester compounds containing cross-linkages and also substantially free from polyester compounds having carboxyl terminal groups, said dissolved polyester fraction being derived from a crude polyester condensation product of a dicarboxylic acid and a glycol, at least one of which monomeric substances has at least 10 carbon atoms per molecule, which crude polyester condensation product is not completely soluble in paraffinic oil at temperatures as low as 15° F.

5. A composition according to claim 4 wherein the major proportion of aliphatic hydrocarbon material is a normally solid petroleum hydrocarbon.

6. Composition according to claim 4 in which the dissolved polyester is a condensation product of a dimerized unsaturated higher fatty acid with a glycol.

7. Composition according to claim 4 also containing a small amount of polymerized silicone.

8. A lubricant comprising a major proportion of a waxy mineral lubricating oil and at least a pour depressing amount of a solvent-separated polyester fraction having an average molecular weight of at least 2,000, completely soluble in said waxy lubricating oil at temperatures as low as 15° F. and substantially free from polyester fractions less soluble in said waxy lubricating oil, said dissolved polyester fraction being derived from a crude polyester condensation product of a dimerized unsaturated higher fatty acid with a glycol, not completely soluble in such waxy mineral lubricating oil at temperatures as low as 15° F.

9. A method of preparing lubricating compositions which comprises making a high molecular weight polyester having an average molecular weight of at least about 2,000, said polyester being a condensation product of a dicarboxylic acid and a glycol at least one of which has at least 10 carbon atoms per molecule, dissolving said crude polyester product containing soluble and insoluble fractions in a paraffinic hydrocarbon liquid at an elevated solution temperature, cooling the resultant solution down to at least 15° F. to precipitate less soluble polyester compounds, filtering the solution to remove precipitated material, and incorporating the soluble polyester fraction in a petroleum oil base stock of the kerosene to lubricating oil boiling range.

DAVID W. YOUNG.
WILLIAM J. SPARKS.

REFERENCES CITED

The following references are of record in the file of this patent:

UNITED STATES PATENTS

| Number | Name | Date |
|---|---|---|
| 2,152,683 | Eichwald | Apr. 4, 1939 |
| 2,123,641 | Wiezevich | July 12, 1938 |
| 2,384,595 | Blair | Sept. 11, 1945 |
| 2,275,007 | Larsen | May 1, 1945 |
| 2,310,997 | Ruthroff | Feb. 16, 1943 |
| 2,239,533 | Mikeska | Apr. 22, 1941 |
| 2,342,113 | Blair | Feb. 22, 1944 |
| 2,330,773 | Zimmer | Sept. 28, 1943 |

FOREIGN PATENTS

| Number | Country | Date |
|---|---|---|
| 428,864 | Great Britain | May 15, 1935 |

OTHER REFERENCES

Industrial and Engineering Chemistry, volume 33, No. 1 (Jan. 1941), "Drying Oils & Resins", by Bradley et al., pages 86–89.